US010196957B2

(12) United States Patent
Petry (10) Patent No.: US 10,196,957 B2
(45) Date of Patent: Feb. 5, 2019

(54) MIXING DEVICE OF AN EXHAUST GAS PURIFICATION SYSTEM OF A MOTOR VEHICLE INTERNAL COMBUSTION ENGINE (71) Applicant: Daimler AG, Stuttgart (DE)

(72) Inventor: Andreas Petry, Affalterbach (DE)

(73) Assignee: Daimler AG, Stuttgart (DE)

( * ) Notice: Subject to any disclaimer, the term of this patent is extended or adjusted under 35 U.S.C. 154(b) by 84 days.

(21) Appl. No.: 15/318,923

(22) PCT Filed: Mar. 26, 2015

(86) PCT No.: PCT/EP2015/000645
§ 371 (c)(1),
(2) Date: Dec. 14, 2016

(87) PCT Pub. No.: WO2015/192926
PCT Pub. Date: Dec. 23, 2015

(65) Prior Publication Data
US 2017/0152782 A1  Jun. 1, 2017

(30) Foreign Application Priority Data

Jun. 17, 2014  (DE) ........................ 10 2014 009 015

(51) Int. Cl.
*F01N 3/00* (2006.01)
*F01N 3/28* (2006.01)
(Continued)

(52) U.S. Cl.
CPC ........ *F01N 3/2892* (2013.01); *B01F 3/04049* (2013.01); *B01F 5/0065* (2013.01);
(Continued)

(58) Field of Classification Search
CPC .. B01F 3/04049; B01F 5/0065; B01F 5/0451; F01N 2240/20; F01N 2470/24; F01N 2610/02
See application file for complete search history.

(56) References Cited

U.S. PATENT DOCUMENTS 4,054,418 A    10/1977  Miller et al.
4,464,901 A *   8/1984  Kobayashi ............ F02B 37/166
                                                      60/606
(Continued)

FOREIGN PATENT DOCUMENTS

DE         42 03 807 A1    8/1993
DE   10 2012 111 335 A1    5/2013
(Continued)

OTHER PUBLICATIONS

English Translation of 102012010878 of Petry Andreas.*
(Continued)

*Primary Examiner* — Audrey K Bradley
*Assistant Examiner* — Anthony Ayala Delgado
(74) *Attorney, Agent, or Firm* — Crowell & Moring LLP (57) ABSTRACT A mixing device of an exhaust gas purification system of an internal combustion engine is disclosed. The mixing device includes swirl tube, a mixing tube arranged in the swirl tube, and an exhaust gas supply tube leading into the swirl tube such that exhaust gas can enter the swirl tube tangentially from the exhaust gas supply tube through a cut-out opening in the lateral surface of the swirl tube and forms a flow rotating around the mixing tube. The exhaust gas completely enters the mixing tube and leaves the interior of the swirl tube completely through the mixing tube. A metering device can spray urea solution into the swirl tube such that the urea solution enters the mixing tube and is entrained by the rotating flow of the exhaust gas and is discharged from the (Continued)

Section A-A swirl tube through the mixing tube together with the exhaust gas.

9 Claims, 4 Drawing Sheets

(51) Int. Cl.
    *B01F 5/00*         (2006.01)
    *B01F 5/04*         (2006.01)
    *B01F 3/04*         (2006.01)
    *F01N 3/20*         (2006.01)

(52) U.S. Cl.
    CPC .......... *B01F 5/0451* (2013.01); *F01N 3/2066* (2013.01); *B01F 2005/0091* (2013.01); *F01N 2240/20* (2013.01); *F01N 2470/18* (2013.01); *F01N 2470/24* (2013.01); *F01N 2610/02* (2013.01); *Y02A 50/2322* (2018.01)

(56) References Cited

U.S. PATENT DOCUMENTS

| | | | | |
|---|---|---|---|---|
| 4,538,413 | A * | 9/1985 | Shinzawa | F01N 3/0256 431/248 |
| 9,188,039 | B2 * | 11/2015 | Nagel | F01N 3/2892 |
| 2006/0218902 | A1 * | 10/2006 | Arellano | F01N 3/025 60/295 |
| 2011/0308234 | A1 * | 12/2011 | De Rudder | B01F 3/04049 60/295 |
| 2013/0064725 | A1 | 3/2013 | Kageyama et al. | |
| 2015/0135683 | A1 * | 5/2015 | Petry | F01N 3/2066 60/286 |
| 2016/0184783 | A1 * | 6/2016 | Tyni | B01F 5/0065 422/169 |

FOREIGN PATENT DOCUMENTS

| | | | | |
|---|---|---|---|---|
| DE | 10 2012 008 556 | A1 | 10/2013 | |
| DE | 102012010878 | A1 * | 12/2013 | .......... F01N 3/2066 |
| DE | 10 2013 211 662 | A1 | 12/2014 | |
| EP | 2 325 452 | A1 | 5/2011 | |
| EP | 2 465 602 | A2 | 6/2012 | |

OTHER PUBLICATIONS

PCT/EP2015/000645, International Search Report dated Jun. 17, 2015 (Two (2) pages).

German Search Report issued in German counterpart application No. 10 2014 009 015.9 dated Feb. 27, 2015, with Statement of Relevancy (Eight (8) pages).

\* cited by examiner

MIXING DEVICE OF AN EXHAUST GAS PURIFICATION SYSTEM OF A MOTOR VEHICLE INTERNAL COMBUSTION ENGINE

BACKGROUND AND SUMMARY OF THE INVENTION

The invention relates to a mixing device of an exhaust gas purification system of a motor vehicle internal combustion engine for mixing urea solution with exhaust gas of the motor vehicle internal combustion engine.

To remove nitrogen oxides from the exhaust gas of especially lean operating motor vehicle internal combustion engines by selective catalytic reduction (SCR) on a so-called SCR catalytic converter, it is common to add aqueous urea solution to the exhaust gas. By thermolysis and/or hydrolysis, ammonia is released in the hot exhaust gas from the urea, which acts as the actual reducing agent for the nitrogen oxides and reduces in the catalytic sites of the SCR catalyst the nitrogen oxides selectively to nitrogen. Here there is a difficulty in distributing the urea solution in the exhaust gas as evenly as possible and to avoid deposits. For this purpose, it has been already proposed to apply a rotating flow to the exhaust gas, prior to the addition of the urea solution. For example, from US 2013/0064725 A1, a mixing device of an exhaust gas purification system is known in which exhaust gas from an exhaust gas tube is supplied to a mixing tube which is perpendicular to the former, wherein the exhaust gas is diverted in its main direction of flow and a rotational flow is applied to it. Urea solution is sprayed into the rotational flow by means of metering device at one end of the mixing tube.

It is an object of the invention to provide a mixing device for mixing urea solution in the exhaust gas, wherein the mixing is further improved and deposits can be more effectively avoided.

The mixing device according to the invention comprises a straight circular cylindrical swirl tube having a first end and a second end opposite the first end and an outer surface with a cutout opening. In the swirl tube a circular cylindrical mixing tube is coaxially arranged comprising an open first end disposed inside the swirl tube and which penetrates a bottom portion of the second swirl tube end. Further, an exhaust gas supply tube, which at least approximately tangentially enters the swirl tube is provided in such a way that exhaust gas coming from the exhaust gas supply tube can at least approximately tangentially enter the swirl tube through the cut out opening in the lateral surface of the swirl tube, and after its entry into the swirl tube forms a rotating flow around the mixing tube, wherein it completely enters the open first end of the mixing tube while maintaining a rotating flow and completely leaves the interior of the swirl tube through the mixing tube. By means of a metering device, which is disposed on the first end of the swirl tube, the urea solution can be sprayed with a conical spray pattern into the swirl tube in such a way that it at least almost completely enters the first open end of the mixing tube and is entrained by the rotating flow of the exhaust gas and is discharged, together with the exhaust gas, through the mixing tube, from the interior of the swirl tube. Maintaining a rotating flow does not necessarily mean that an originally existing swirl is maintained with respect to strength and direction of the flow velocity, but that a rotating flow, which has been applied to the exhaust gas when flowing into the swirl tube, and which essentially helically rotates around the mixing tube is continued in the mixing tube, as here the gas flow has an average angular momentum vector, which also has an axially directed component. In the end, due to the inventive design of the mixing device, in the swirl tube, recirculation of exhaust gas and flow dead zone and hence deposits can be largely avoided.

Between the mixing tube open first end and the first end of the swirl tube, a certain back pressure arises from the fact that the exhaust gas is completely forced into the mixing tube, so that the pressurized urea solution which is sprayed from the metering device is additionally accelerated. Since the exhaust gas entering the swirl tube flows around the mixing tube, this is additionally heated by exhaust gas, which effectively prevents the formation of crystallization deposits in the mixing tube. The corresponding acute angle of the cone-shaped spray ensures that urea solution reaches at least approximately only the interior of the mixing tube and thus that it virtually does not wet the inside of the typically somewhat colder swirl tube and then forming deposits. Already in the mixing tube a preparation of the urea solution can take place, not only by mixing with the exhaust gas, but also by evaporation of aqueous components and further through a more or less strong decomposition of urea with the release of gaseous ammonia as a result of thermolysis and/or hydrolysis. In this context, a common discharge of urea solution and exhaust gas from the mixing tube is to be understood in the sense that converted constituents of the urea solution are discharged from the mixing tube together with the exhaust gas. Due to the formation of a rotatory exhaust gas flow throughout the swirl tube the mixing of urea solution with exhaust gas already takes place immediately after the spraying. Due to the existing rotational flow of the exhaust gas also in the mixing tube, a continuous mixing and preparation takes place, and further an even distribution of the sprayed urea solution through the mixing tube cross-section is made possible.

In an embodiment of the invention the mixing tube has a closed lateral surface. This ensures that exhaust gas can only enter the open end opposite the metering device, and that the rotating exhaust gas flow caused by the at least approximately tangential exhaust gas inlet into the swirl tube is maintained until the inlet of the mixing tube and further beyond.

In a further embodiment of the invention, the exhaust gas supply tube at its inflow into the swirl tube has an axially expanding, with respect to the swirl tube, cross-sectional enlargement. By this measure, flow resistance for the exhaust gas is reduced, in particular in the transition from gas supply tube into the swirl tube, thereby reducing pressure losses. Upstream of the cross-sectional enlargement, the cross section of the exhaust gas supply tube is preferably at least partially uniform and round.

In a further embodiment of the invention, the cutout opening extends along its longest dimension with respect to the swirl tube axis from a portion close to the second end of the swirl tube into a portion close to the open first end of the mixing tube. Preferably, the cutout opening extends up to a few millimeters, that is to within less than 10 mm, in particular less than 5 mm from the second end of the swirl tube. On the opposite side, the cutout opening extends, in relation to the axis of the mixing tube or swirl tube preferably up to less than 30 mm, in particular less than 20 mm from the open first end of the mixing tube. The mixing tube portion arranged in the interior of the swirl tube thus has a length which is only slightly longer than the longest axial extension of the cutout opening. Preferably, the length of mixing tube portion inside the swirl tube is about 125% of the longest dimension in the axial direction of the cutout opening. The mixing tube portion arranged in the interior of the swirl tube preferably has a length which is about 60%-70% of the total length of the swirl tube. This results in a particularly compact design.

In another embodiment of the invention, the cross-sectional area of the mixing tube corresponds at least approximately to the smallest cross-sectional area of the exhaust supply tube, wherein, in a further embodiment of the invention, the difference of the cross-sectional area of the swirl tube and the cross-sectional area of the mixing tube is larger, by at least 30 percent, than the smallest cross-sectional area of the exhaust gas supply tube. As a result of this design, restrictions of the exhaust gas flow path downstream of the confluence of the exhaust supply tube in the swirl tube are avoided. Due to the fact that the free area between the mixing tube and swirling tube is larger than the cross-sectional area of the exhaust gas supply tube, during the inflow of the exhaust gas into the swirl tube a sudden enlargement of the flow cross-section is obtained, which in turn causes an acoustic damping. Therefore, the flow noise is particularly low.

In a further embodiment of the invention, a funnel element conically opening in the direction of the open first mixing tube end is provided with a cone axis which is at least approximately collinear to the swirl tube axis and a perforated conical surface into which the metering device can spray the urea solution at least approximately completely. The funnel element takes the conical spray of sprayed urea solution at least approximately completely. The perforation of the conical surface allows an approximately radially directed exhaust access to the interior of the funnel element. An exhaust gas entrance into the funnel element is, however, also made possible in the axial direction by a circular cylindrical opening at the pointed end of the funnel element, through which the spray passes into the interior of the funnel element. This allows the sprayed urea solution to be captured and entrained by the exhaust gas in the axial direction in the direction of the open end of the mixing tube of the exhaust flow. Preferably by constructive means it is ensured that the exhaust gas flow velocity in the area of the funnel element is more than twice as large as at the entry point into the swirl tube. Preferably, it is also significantly greater than the original speed of sprayed urea solution droplets. This allows an effective entrainment of the droplets and their atomized distribution to form a fine spray. The other open end of the funnel element extends up to a few millimeters, preferably about 20 mm from the open end of the mixing tube. The diameter of the larger funnel element opening is preferably about half of the mixing tube diameter. This ensures that sprayed urea solution can be at least almost completely injected into the mixing tube.

In a further embodiment of the invention, an enclosing tube housing the funnel element with a largely perforated lateral surface is provided. The enclosing tube may be circular cylindrical, or conical, or frustoconical. In case of a frustoconical design a cone opening is preferably provided in the direction of the first swirl tube end. Through the enclosing tube a mechanical support of the funnel element is made possible. For this purpose, the enclosing tube is connected at one end with the larger opening of the funnel element, and is connected, with a forced or form fit thereto. The other end of the enclosing tube is preferably connected on the edge to a bottom portion of the first swirl tube end or with a console carrying the metering device with a force or form fit. With this embodiment, a high mechanical stability is assured. The hole area of the perforation of the enclosing tube preferably constitutes at least half of the total lateral enclosing surface. Thus obstruction of the exhaust gas flow is substantially avoided.

In a further embodiment of the invention, a flow baffle with arms which at least approximately open in a V-shape in the direction of the second swirl tube end are provided, wherein the arms are joined along their V-shaped profile line with a form fit to the lateral surface of the mixing tube and along their other opposite V-shaped profile line at least approximately in touching contact with the lateral surface of the swirl tube and a connecting line of the arms is at least approximately oriented in a direction parallel to the longitudinal direction of the exhaust gas supply tube direction. In the longitudinal direction of the flow baffle, the baffle extends approximately from the connection line at the height of the central axis of the exhaust gas supply tube of arms to at least approximately the bottom of the second swirl tube end. Here, the arm closer to the exhaust gas supply tube is preferably at least approximately aligned in the axial direction of the mixing tube or swirl tube. The opening angle of the arms is preferably about 45 degrees. The flow baffle causes a deflection of the flow of exhaust gas introduced in the swirl tube towards the open end of the mixing tube to form a flow spirally rotating about the mixing tube. This particularly applies to flow filaments of gas, which have flowed close to the second swirl tube end almost completely around the mixing tube.

Advantageous embodiments of the invention are illustrated in the drawings and will be described below, wherein like components are identified in the figures by the same reference numerals. The above-mentioned and hereinafter still to be explained features are usable without departing from the scope of the invention not only in the particular combination of features, but also in other combinations or alone.

DETAILED DESCRIPTION OF THE DRAWINGS

Figure 1:
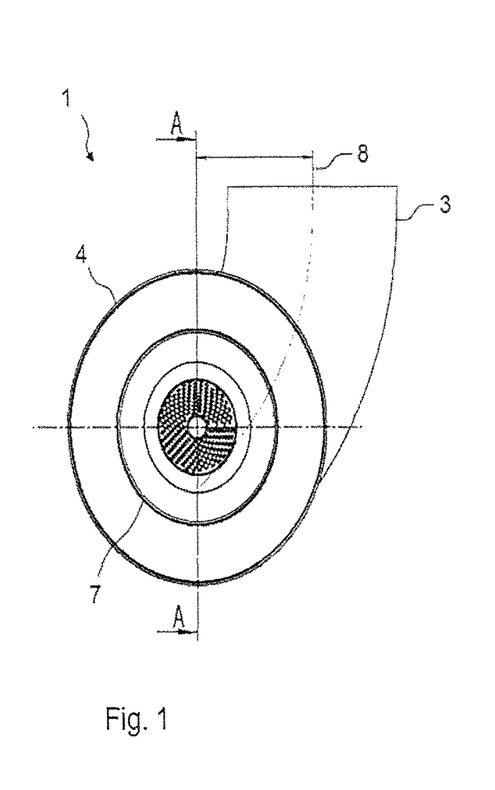
FIG. 1 is a first view of a first preferred embodiment of the mixing device according to the invention.
Figure 2:
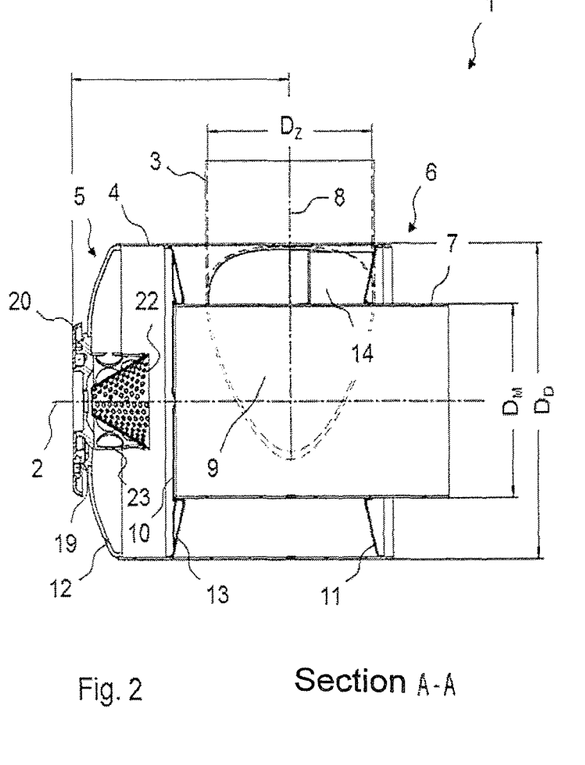
FIG. 2 is a second view of the embodiment shown in FIG. 1.
Figure 3:
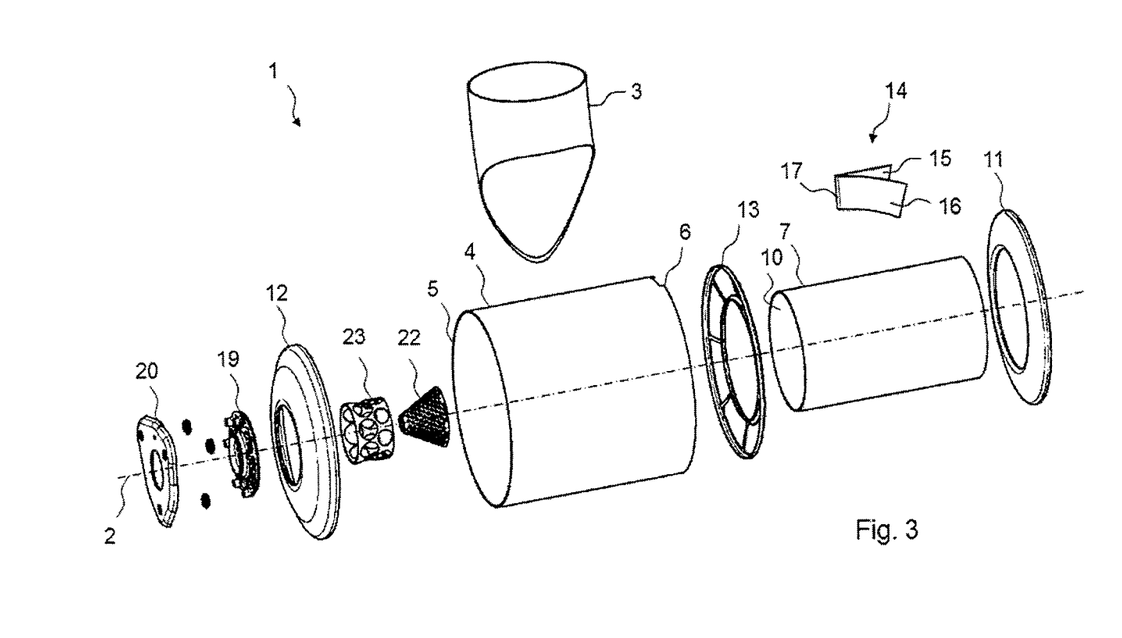
FIG. 3 is an exploded view of the mixing device of the invention according to FIG. 1 and FIG. 2.

In order to explain a first preferred embodiment of the mixing device according to the invention reference is first made to FIGS. 1 to 3. Here, FIG. 1 shows the mixing device 1 in a top view in the direction of a first axis 2. In FIG. 2 a sectional view perpendicular thereto viewed along the section line A-A is shown. FIG. 3 shows the mixing device 1 in an exploded view. The representations are at least approximately to scale.

The mixing device 1 comprises an exhaust gas supply tube 3, a swirl tube 4 having a first end 5 and an opposing second end 6, as well as a mixing tube 7. The tubes 3, 4, 7 are in the present case circular-cylindrical. In particular, however, the exhaust gas supply tube 3 can also have a different cross-sectional shape, for example, approximately rectangular with rounded corners. The exhaust gas supply tube 3 and the swirl tube 4 are mutually arranged so that a central axis 8 of the exhaust gas supply tube 3 is situated in a cross-sectional plane of the swirl tube 4. The exhaust gas supply tube 3 opens into the swirl tube 4 at least approximately tangentially, for which purpose the swirl tube 4 is provided on its otherwise closed lateral surface with a cutout opening 9, whose edge contour is connected flush and with a material fit with the edge contour of the exhaust gas supply tube end. The approximately tangential opening of the exhaust gas supply tube 3 into the swirl tube 4 results from the fact that the center axis 8 of the exhaust gas supply tube 3 on the one hand is directed to an area outside the cross-sectional center of the swirl tube 4 and on the other hand, as shown, in the end portion of the exhaust gas supply tube 3 it is preferably approximately parallel to the outer contour of the swirl tube 3.

The mixing tube 7 also has a closed lateral surface and is arranged coaxially to the swirl tube 4 of larger diameter so that a first end 10 of the mixing tube 7 open over the entire cross-section is positioned within the swirl tube 4 and closer to the first end 5 than to the second end 6. The mixing tube 7 penetrates the second end 6 of the swirl tube 4 which is closed by a second annular bottom portion 11. The second bottom portion 11 is on the one hand gas-tightly connected on the outer circumference with the swirl tube 4 at its second end 6, and on the other hand is connected on the inner circumferential side in a gastight manner to the enclosing of the mixing tube 7. Thus, at the second swirl tube end 6, exhaust gas can leave the inside of the swirl tube 4 only through the mixing tube 7. A first bottom portion 12 terminates the first end 5 of swirl tube 4. On this first bottom portion 12 a metering device, not shown in FIGS. 1 to 3, is arranged, which can spray urea solution or another liquid containing ammonia in its free or bound form, approximately in the direction of axis 2 into the swirl tube 4 or mixing tube 7, which will be discussed in more detail below. The mixing tube 7 is mechanically stabilized in its position with respect to swirl tube 4 on one side to its second end 6 by circumferential connection with the second bottom portion 11 and on the other side by an annular support element 13 with radial spokes. The support element 13 is positioned, as shown, preferably at the first open end 10 of mixing tube 7 and supports this all around radially against the swirl tube 4.

Due to this embodiment of the mixing device 1, on the exhaust gas flowing through the supply tube 3 into the swirl tube 4, a helical rotation around the mixing tube 7 is imparted. This rotation has, in the cylindrical annular portion between swirl tube 4 and mixing tube 7, a direction component which is directed from the second end 6 of the swirl tube 4 to the first end 5 of the same. The exhaust gas flowed into the swirl tube 4 is completely forced through the first open end 10 of the mixing tube 7 in the latter, and it continues to execute a rotational movement. Since an outflow from the interior of the swirl tube 4 is possible exclusively via the mixing tube 7, the exhaust gas flow in the interior of the mixing tube 7 necessarily comprises a component in the direction of the axis 2, which is however directed in the opposite direction in comparison with the exhaust gas flow in the cylindrical annular portion between the swirl tube 4 and mixing tube 7.

To support the generation of an angular momentum for the exhaust gas flowing into the swirl tube 4 and to avoid a backflow a flow baffle 14 is presently provided. The flow baffle 14 is preferably arranged in the area of the second end of the swirl tube 4 on the upper side of the mixing tube 7, i.e., positioned on its outer side and at least approximately as far as possible in parallel to the central axis 8 of the exhaust gas supply tube 3 against the direction of the incoming flow of exhaust gas. The present flow baffle 14 has two arms 15, 16, which open at an acute angle and approximately in a V-shape in the direction of the second end 6 of the swirl tube, which are connected to each other along a direction parallel to the central axis 8 of the exhaust gas supply tube 3. The arm 15 which is closer to the supply tub 3 is preferably at least approximately aligned in the direction of the first axis 2. Preferably, the two arms 15, 16 are connected in a form-fitting manner along their upper profile line with the inside of the swirl tube cylinder shell and along their lower profile line with the outside of the mixing tube cylinder enclosing. The arm ends opposite the connecting line 17 are preferably abutting against the second bottom portion 11 or are connected with it with a form and/or material fit. The two arms 15, 16 get close to the second bottom portion 11 up to a very small distance.

Figure 4:
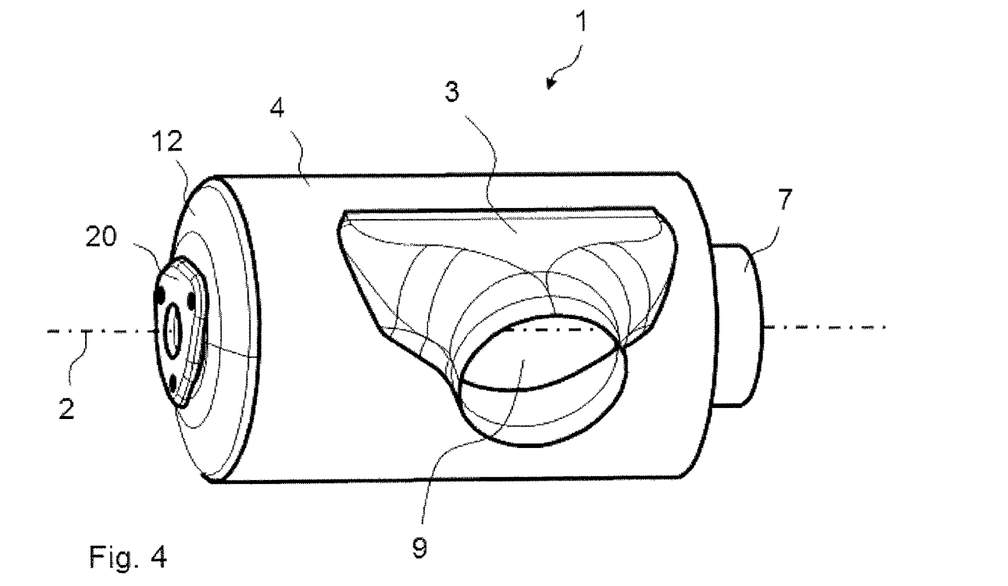
FIG. 4 is a first view of a second preferred embodiment of the mixing device according to the invention.
Figure 5:
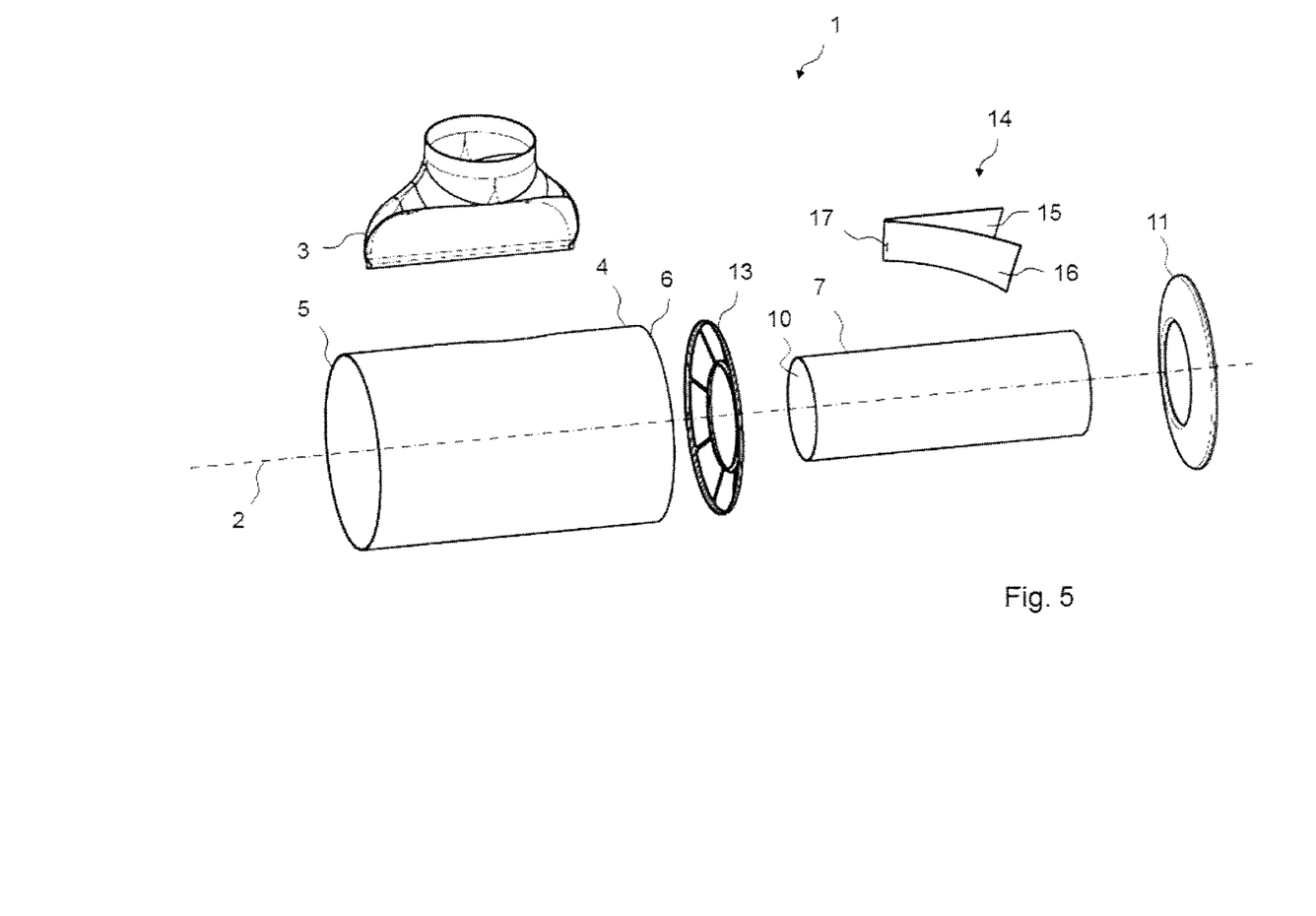
FIG. 5 is an exploded view of the mixing device of the invention according to FIG. 4.

Hereinafter, with reference to FIGS. 4 and 5, a second advantageous embodiment of the mixing device 1 according to the invention is described, wherein the existing differences compared to the first embodiment are mainly discussed. Here, FIG. 4 schematically is a perspective view and FIG. 5 is an exploded view similar to FIG. 3.

As can be seen, the second advantageous embodiment of the mixing device 1 is characterized by a cross-sectional enlargement of the exhaust supply tube 3 immediately before flowing into the swirl tube 4. The enlargement of the cross section is in the present case obtained by a mirror-symmetrical widening of the round supply tube 3 upstream of the cross-sectional expansion in the direction of the central axis 2. The swirl tube 4 may be extended for this purpose in comparison with the first embodiment described in FIGS. 1 to 3. Due to the cross-sectional widening at the flow transition from exhaust gas supply tube 3 to swirl tube 4, pressure losses are reduced especially in the inflow of the exhaust gas in the swirl tube 4. Furthermore, the stability and uniformity of the rotational flow is improved.

Subsequently, with additional reference to FIG. 6, the introduction of the urea solution in the swirl tube 4 is detailed. In this, FIG. 6 shows an end portion of the mixing device 1 with mounted metering device for urea solution in a schematic sectional view.

Figure 6:
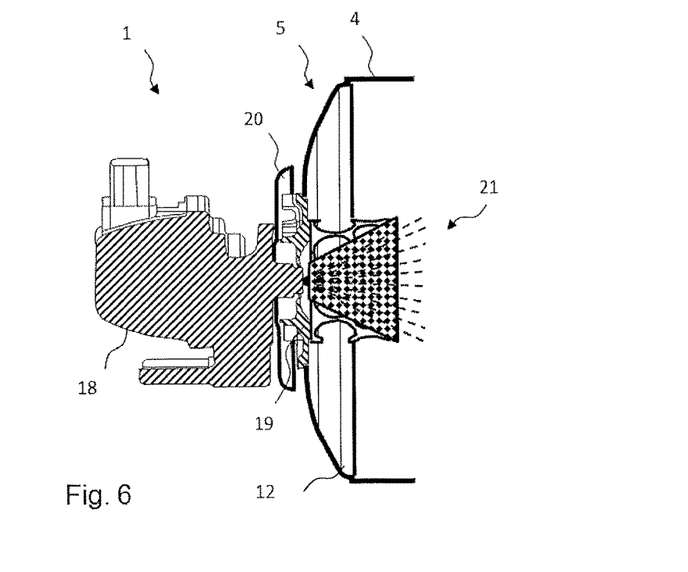
FIG. 6 is a schematic sectional view of an end portion of the mixing device according to the invention.

The metering device indicated in FIG. 6 by the reference number 18 is connected or screwed with the swirl tube 4 and with its first bottom portion 12 with interposition of a console formed by a heat sink 20 via a flange 19 preferably as a fine cast component. For this purpose, the round flange 19 provided with corresponding screw holes is connected with a form or material fit with an edge contour of a centrally arranged opening provided in the first bottom portion 12. The arrangement is preferably designed such that a nozzle tip of the metering device 18 is arranged with its nozzle opening in the portion of the opening of the first bottom portion 12 at least approximately on the central axis 2 of the swirl tube 4 or of the mixing tube 7. The metering device 18 may spray urea solution with a conical spray 21 the opens toward the first open end 10 of the mixing tube 7 so that sprayed urea solution at least almost completely enters in the open first end 10 of the mixing tube 7, where it is captured by the rotating exhaust gas flow and is discharged through the mixing tube 7 from the inner portion of the swirl tube 4 and transported further in the direction of a SCR catalyst, not shown. On the one hand, still in the mixing tube 7, a uniform distribution of the sprayed urea solution and on the other hand, an evaporation and a release of ammonia take place.

To further improve the forming of the spray jet and of the distribution of sprayed urea solution and also for a centering of the exhaust gas rotational flow with respect to the central axis 2 a funnel element 22, which opens in the direction of the first open end 10 of mixing tube 7 and having respective open ends is provided, in which the spray jet 21 is sprayed. Here, the open wide end of the funnel element 22 is arranged at a distance of about 20 mm from the first open end 10 of the mixing tube. The opposite end of the funnel element 22 is arranged in the immediate vicinity of the nozzle tip of the metering device 18. The funnel member 22 has a small perforated conical surface having a plurality of holes through which gas can enter approximately radially inside the funnel element 22. Thus sprayed urea solution is accelerated in the direction of the mixing tube 7. An additional acceleration of sprayed urea solution is provided by an exhaust gas inlet arranged into the opening at the pointed end of the funnel element 22. The opening angle of the funnel element 22 corresponds at least approximately to the opening angle of the spray jet 21 so that the spray jet 21 is enclosed by the casing of the funnel element 22. The funnel element 22 is presently supported by a circular cylindrical casing tube 23, which with one end is connected flush to the wide end of the funnel element 22 and is there connected peripherally by form fit or material fit with the funnel element 22. At its other end, the enclosing tube 23 is connected to the flange 19. The enclosing tube 23 is provided with a large perforated area in order to ensure a substantially unobstructed exhaust gas inlet.

Very advantageous flow conditions can be achieved in the mixing device 1 with the following dimensions. On the one hand the diameter $D_M$ of the mixing tube is selected to be preferably at least approximately equal to the diameter $D_Z$ of the exhaust gas supply tube 3 before an optionally provided cross-sectional enlargement. For exhaust gas escaping through the mixing tube 7 from the swirl tube 4, this results in at least approximately the same flow resistance as for exhaust gas flowing through the supply tube 3 into the swirl tube 4. On the other hand, the diameter $D_D$ of the swirl tube 4 is at least 50% greater than the diameter $D_Z$ selected for the exhaust gas supply tube 3 before an optionally provided cross-sectional widening. As a result of this dimensioning a jump of the free flow cross section for exhaust gas flowing into the swirl tube 4 is obtained. This has a positive effect on the acoustics of the mixing device 1, i.e., the flow noise of the exhaust gas is reduced. It is further provided that the cutout opening 9 extends in the casing of the swirl tube 4 with respect to its longest dimension in the direction of the axis 2 from a portion near the second end 6 of the swirl tube 4 to a portion near the open end 10 of the mixing tube 7. The result is a compact, short version of the mixing device 1. Decisively, due to the spraying of urea solution in the mixing tube 7, surrounded by flowing exhaust gas, an excellent treatment of the sprayed urea solution is still obtained.

LIST OF REFERENCE NUMBERS

1 mixing device
2 axis
3 exhaust gas supply tube
4 swirl tube
5 first swirl tube end
6 second swirl tube end
7 mixing tube
8 central axis of exhaust gas supply tube
9 cutout opening
10 first mixing tube end
11 second base part
12 first base part
13 support element
14 flow baffle
15 arm support element
16 arm support element
17 connecting line
18 metering device
19 flange
20 cooling plate
21 spray jet
22 funnel element
23 enclosing tube
$D_M$ diameter of the mixing tube
$D_Z$ diameter of the exhaust gas supply tube
$D_D$ diameter of the swirl tube

The invention claimed is:

1. A mixing device of an exhaust gas purification system of a motor vehicle internal combustion engine for mixing urea solution with exhaust gas of the motor vehicle internal combustion engine, comprising:
   a straight circular cylindrical swirl tube which has a first end and a second end opposite the first end and a lateral surface having a cut-out opening;
   a circular cylindrical mixing tube which is disposed in the swirl tube in some sections and coaxially to the swirl tube, wherein the mixing tube has an open first end disposed inside the swirl tube and penetrates a bottom part of the second end of the swirl tube and wherein the mixing tube has a completely closed lateral surface such that the exhaust gas can only enter the mixing tube at the open first end of the mixing tube;
   an exhaust gas supply tube, at least approximately tangentially entering the swirl tube such that the exhaust gas can enter from the exhaust gas supply tube through the cut-out opening in the lateral surface of the swirl tube at least approximately tangentially into the swirl tube and forms a flow rotating around the mixing tube after the exhaust gas has entered the swirl tube, wherein the exhaust gas, while maintaining a rotating flow, completely enters the open first end of the mixing tube and leaves an interior of the swirl tube completely through the mixing tube;
   a metering device disposed at the first end of the swirl tube, wherein urea solution is sprayable into the swirl tube by the metering device with a conical spraying pattern such that the urea solution at least approximately completely enters the open first end of the mixing tube and is entrained by the rotating flow of the exhaust gas and is discharged from the interior of the swirl tube through the mixing tube together with the exhaust gas; and
   a funnel element which conically opens in a direction of the open first end of the mixing tube, wherein the funnel element has a cone axis which is at least approximately collinear with a swirl tube axis and wherein the urea solution is at least approximately completely sprayable by the metering device into the funnel element.

2. The mixing device according to claim 1, wherein a conical lateral surface of the funnel element is perforated.

3. The mixing device according to claim 1, wherein the funnel element has a cylindrical circular opening at a pointed end of the funnel element.

4. The mixing device according to claim 1, wherein the exhaust gas supply tube has at a junction with the swirl tube an axially expanding cross-sectional enlargement with respect to the swirl tube.

5. The mixing device according to claim 1, wherein the cutout opening extends along a longest dimension of the cutout opening, with respect to a swirl tube axis, from a first portion near the second end of the swirl tube to a second portion close to the open first end of the mixing tube.

6. The mixing device according to claim 1, wherein a cross-sectional area of the mixing tube at least approximately corresponds to a smallest cross-sectional area of the exhaust gas supply tube.

7. The mixing device according to claim 1, wherein a difference of a cross-sectional area of the swirl tube and a cross-sectional area of the mixing tube is at least 30 percent greater than a smallest cross-sectional area of the exhaust gas supply tube.

8. The mixing device according to claim 1, further comprising an enclosing tube with a perforated lateral surface, wherein the funnel element is received within the enclosing tube.

9. The mixing device according to claim 1, further comprising a flow baffle having arms which open, at least approximately, in a direction of the second end of the swirl tube, wherein the arms are connected along a first profile line with a form fit with a lateral surface of the mixing tube, wherein the arms have along a second profile line at least approximately touching contact with the lateral surface of the swirl tube, and wherein a connecting line of the arms is at least approximately oriented in a direction which is parallel to a longitudinal direction of the exhaust gas supply tube.

* * * * *